United States Patent
Takasaki et al.

(10) Patent No.: US 11,524,284 B2
(45) Date of Patent: Dec. 13, 2022

(54) EXHAUST GAS PURIFICATION DEVICE USING METAL SUBSTRATE AND PRODUCTION METHOD THEREFOR

(71) Applicant: CATALER CORPORATION, Kakegawa (JP)

(72) Inventors: Kohei Takasaki, Kakegawa (JP); Yuji Matsuhisa, Kakegawa (JP); Nobuaki Bando, Kakegawa (JP); Hiroshi Ono, Kakegawa (JP); Tomohito Mizukami, Kakegawa (JP); Tsuyoshi Ito, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 229 days.

(21) Appl. No.: 16/758,561

(22) PCT Filed: Sep. 14, 2018

(86) PCT No.: PCT/JP2018/034263
§ 371 (c)(1),
(2) Date: Apr. 23, 2020

(87) PCT Pub. No.: WO2019/082553
PCT Pub. Date: May 2, 2019

(65) Prior Publication Data
US 2020/0346200 A1   Nov. 5, 2020

(30) Foreign Application Priority Data
Oct. 27, 2017   (JP) .............................. JP2017-208135

(51) Int. Cl.
*B01J 21/00*   (2006.01)
*B01J 23/63*   (2006.01)
(Continued)

(52) U.S. Cl.
CPC .......... *B01J 37/0225* (2013.01); *B01D 53/94* (2013.01); *B01J 23/63* (2013.01); *B01J 35/04* (2013.01);
(Continued)

(58) Field of Classification Search
CPC ... B01J 21/00; B01J 23/63; B01J 35/04; B01J 37/0225; B01J 37/0236; B01J 37/08; B01D 53/94; F01N 3/2807
See application file for complete search history.

(56) References Cited

U.S. PATENT DOCUMENTS 4,088,606 A  *  5/1978  Fedor ................... F01N 3/2807
                                                    502/316
4,186,172 A  *  1/1980  Scholz .................. F01N 3/2842
                                                    60/299
(Continued)

FOREIGN PATENT DOCUMENTS

EP    0705962 A1   4/1996
EP    3666377 A1   6/2020
(Continued)

OTHER PUBLICATIONS

Dec. 11, 2018 Written Opinion of the International Searching Authority issued in International Patent Application No. PCT/JP2018/034263.
(Continued)

*Primary Examiner* — Cam N. Nguyen
(74) *Attorney, Agent, or Firm* — Oliff PLC

(57) ABSTRACT

An exhaust gas purification device has a metal substrate and a catalyst layer on the metal substrate, wherein the metal substrate is a wound body of one or a plurality of metal foils, at least one of the one or a plurality of metal foils is a perforated metal foil having holes, the catalyst layer contains noble metal catalyst particles and a carrier for carrying the
(Continued)

noble metal catalyst particles, and more noble metal catalyst particles are present in the catalyst layer on side surfaces of holes, which face an upstream side of an exhaust gas flow, than in the catalyst layer on side surfaces of holes, which face a downstream side of the exhaust gas flow.

5 Claims, 6 Drawing Sheets

(51) Int. Cl.
  *B01J 35/04*  (2006.01)
  *B01D 53/94*  (2006.01)
  *F01N 3/28*  (2006.01)
  *B01J 37/02*  (2006.01)
  *B01J 37/08*  (2006.01)

(52) U.S. Cl.
  CPC .......... *B01J 37/0236* (2013.01); *B01J 37/08* (2013.01); *F01N 3/2807* (2013.01); *B01D 2255/1023* (2013.01); *B01D 2255/1025* (2013.01); *F01N 2330/02* (2013.01); *F01N 2370/02* (2013.01)

(56) References Cited

U.S. PATENT DOCUMENTS

| | | | |
|---|---|---|---|
| 4,318,888 A * | 3/1982 | Chapman | F01N 3/2814 428/116 |
| 4,382,323 A * | 5/1983 | Chapman | B01D 53/86 29/890 |
| 4,829,655 A * | 5/1989 | Cornelison | B01J 27/24 29/527.4 |
| 4,987,034 A | 1/1991 | Hitachi et al. | |
| 5,618,498 A * | 4/1997 | Konya | F01N 3/2026 422/177 |
| 5,665,669 A * | 9/1997 | Yamanaka | B01J 35/04 502/527.22 |
| 5,898,016 A * | 4/1999 | Takei | B01J 35/04 502/527.22 |
| 6,267,932 B1 * | 7/2001 | Nilsson | F01N 3/281 422/177 |
| 6,524,563 B1 * | 2/2003 | Wire | A61Q 5/12 424/70.28 |
| 7,743,499 B2 * | 6/2010 | Pettit | B21D 13/10 29/527.1 |
| 9,028,625 B2 * | 5/2015 | Inaguma | B01J 37/0225 148/531 |
| 9,381,467 B2 * | 7/2016 | Murawaki | F01N 3/281 |
| 9,616,411 B2 * | 4/2017 | Inaguma | C23C 2/28 |
| 9,938,146 B2 * | 4/2018 | Lin | B01J 19/32 |
| 10,307,749 B2 * | 6/2019 | Fowler | B01J 29/06 |
| 2005/0170957 A1 | 8/2005 | Maus et al. | |
| 2007/0197382 A1 * | 8/2007 | West | B01J 19/249 502/527.23 |
| 2009/0148357 A1 * | 6/2009 | Kaneeda | F01N 3/0814 502/305 |
| 2010/0203238 A1 * | 8/2010 | Magno | B01J 19/2485 427/156 |
| 2012/0021896 A1 | 1/2012 | Nakano et al. | |

FOREIGN PATENT DOCUMENTS

| | | |
|---|---|---|
| JP | H4-104839 A | 4/1992 |
| JP | 2005-299520 A | 10/2005 |
| JP | 2006-15205 A | 1/2006 |
| JP | 2006-231167 A | 9/2006 |
| JP | 2009-525856 A | 7/2009 |
| JP | 2009-178647 A | 8/2009 |
| JP | 2015-163385 A | 9/2015 |
| WO | 2004/022937 A1 | 3/2004 |
| WO | 2007/090618 A1 | 8/2007 |
| WO | 2010/114132 A1 | 10/2010 |
| WO | 2015/115011 A1 | 8/2015 |

OTHER PUBLICATIONS

Dec. 11, 2018 International Search Report issued in International Patent Application No. PCT/JP2018/034263.

May 6, 2021 Search Report issued in European Patent Application No. 18870211.2.

Oct. 8, 2020 Office Action issued in Indian Patent Application No. 202017017422.

* cited by examiner (a)

(b)

(a)

(b)

(c)

(a)

(b)

EXHAUST GAS PURIFICATION DEVICE USING METAL SUBSTRATE AND PRODUCTION METHOD THEREFOR

FIELD

The present invention relates to an exhaust gas purification device using a metal substrate and a production method therefor. In particular, the present invention relates to an exhaust gas purification device having a high purification performance due to efficiently carrying a noble metal catalyst in regions where the probability of contact with the exhaust gas is high, and a production method therefor.

BACKGROUND

Exhaust gas purification devices using a substrate made of a metal (metal substrate) are widely used as exhaust gas purification devices for internal combustion engines for motorcycles, generators, and agricultural machinery. Metal substrates are generally wound bodies of a laminate composed of a metal foil which is machined into a corrugated shape and a flat metal foil. For example, as shown in FIG. 2, a metal substrate (1) is obtained by machining a metal foil into a corrugated shape to obtain a corrugated foil (2), then rolling the corrugated foil (2) together with a flat foil (3), which is a planar metal foil. The wound body obtained in this manner is optionally inserted into an outer cylinder (4).

Metal substrates in which holes are present in the corrugated foil and the flat foil are known. Patent Literature 1 and 2 disclose such metal substrates having holes and exhaust gas purification devices using the metal substrates. As an aspect of a metal substrate having holes, wound bodies of an expanded metal, i.e., a metal foil having a structure in which staggered cuts are made therein and the cuts are subsequently widened by stretching the metal foil, are also known. For example, Patent Literature 3 and 4 disclose such substrates.

Metal substrates generally have a smaller number of cells per unit area and a larger open hole diameter of the cells than ceramic substrates which are used for the exhaust gas purification device of an automobile. Metal substrates generally have a more non-homogeneous cell shape than ceramic substrates. This is because ceramic substrates are manufactured by extrusion using a mold, while metal substrates are manufactured as described above.

In light of such circumstances, in an exhaust gas purification device using a metal substrate, a catalyst layer is formed by immersing the metal substrate in a catalyst layer-forming slurry, and then removing the metal substrate from it and drying (so-called "wash-coating"). By carrying out wash-coating, the catalyst layer can be homogeneously formed in the cells of a metal substrate having large and comparatively non-homogeneous cells.

Conversely, regarding ceramic substrates, a method in which a catalyst layer is formed by applying a slurry onto an upper part of a substrate and thereafter suctioning it from a lower part thereof is known, as described in Patent Literature 5 and 6.

CITATION LIST

Patent Literature

[PTL 1] WO 2004/022937
[PTL 2] Japanese Unexamined Patent Publication (Kokai) No. 2009-178647
[PTL 3] Japanese Unexamined Patent Publication (Kokai) No. 4-104839
[PTL 4] Japanese Unexamined Patent Publication (Kokai) No. 2015-163385
[PTL 5] Japanese Unexamined Patent Publication (Kokai) No. 2006-15205
[PTL 6] WO 2010/114132

SUMMARY

Technical Problem

The present invention aims to provide an exhaust gas purification device having a high purification performance due to efficiently carrying a noble metal catalyst in regions where the probability of contact with the exhaust gas is high, and a production method therefor.

Solution to Problem

The present inventors have discovered that the above object can be achieved by the present invention, which has the following aspects.

Aspect 1

An exhaust gas purification device comprising a metal substrate and a catalyst layer on the metal substrate, wherein
  the metal substrate is a wound body of one or a plurality of metal foils,
  at least one of the one or a plurality of metal foils is a perforated metal foil having holes,
  the catalyst layer contains noble metal catalyst particles and a carrier for carrying the noble metal catalyst particles, and
  more noble metal catalyst particles are present in the catalyst layer on side surfaces of holes, which face an upstream side of an exhaust gas flow, than in the catalyst layer on side surfaces of holes, which face a downstream side of the exhaust gas flow.

Aspect 2

The exhaust gas purification device according to Aspect 1, wherein per unit area on a weight basis, an average of 1.1 times more noble metal catalyst particles are present in the catalyst layer on side surfaces of holes, which face the upstream side of an exhaust gas flow, than in the catalyst layer on side surfaces of holes which face the downstream side of the exhaust gas flow.

Aspect 3

The exhaust gas purification device according to Aspect 1 or 2, wherein the wound body is a wound body in which a flat foil and a corrugated foil are stacked.

Aspect 4

The exhaust gas purification device according to Aspect 3, wherein the aperture rates of the flat foil and the corrugated foil are each in the range of 10% to 90%.

Aspect 5

The exhaust gas purification device according to any one of Aspects 1 to 3, wherein the wound body is a wound body of expanded metal.

Aspect 6

An exhaust gas purification device production method, including at least the following steps (a) to (c):
(a) supplying a catalyst layer-forming slurry from one end of a wound body having a perforated metal foil;
(b) coating the wound body with the catalyst layer-forming slurry by discharging the supplied catalyst layer-forming slurry from the other end of the wound body; and
(c) drying and/or firing the coated wound body.

Aspect 7

The production method according to Aspect 6, wherein in step (b), the slurry is discharged by suctioning from the other end of the wound body.

Aspect 8

The production method according to Aspect 6 or 7, which is used to obtain the exhaust gas purification device according to any one of Aspects 1 to 5.

DESCRIPTION OF EMBODIMENTS

Exhaust Gas Purification Device

Figure 1:
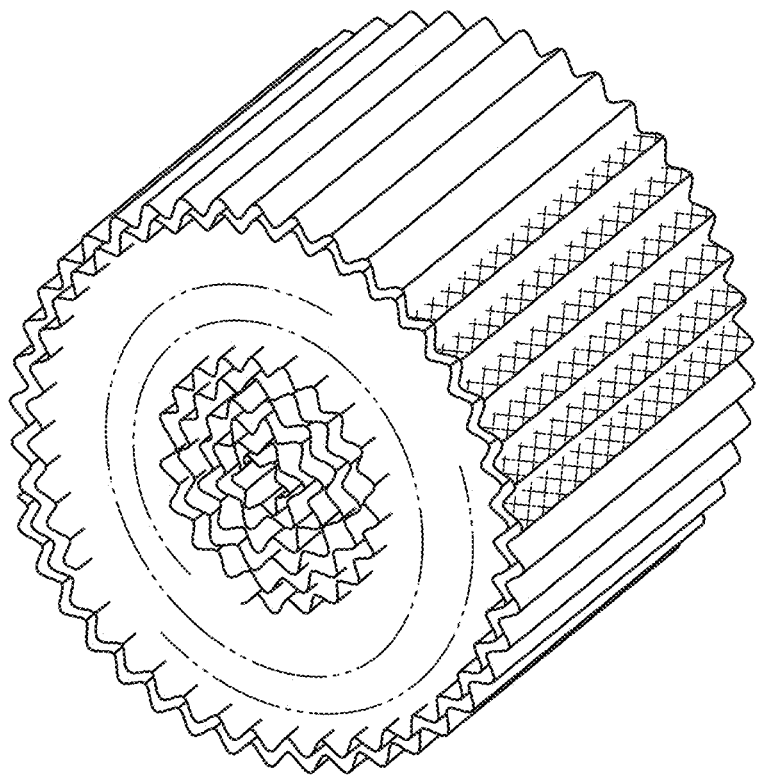
FIG. 1(a) is a schematic view showing an exhaust gas purification device according to the present invention, which uses a wound body of perforated metal foil, which is an expanded metal, as a metal substrate.
FIG. 1(b) is a schematic view showing an exhaust gas purification device according to the present invention, which uses a wound body of perforated metal foil, which has punched holes, as a metal substrate.
Figure 1:
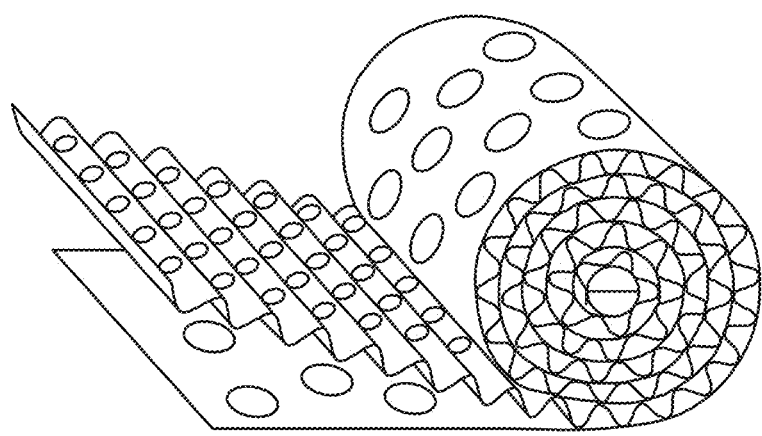

The exhaust gas purification device of the present invention comprises a metal substrate and a catalyst layer on the metal substrate. The metal substrate is one or a plurality of metal foil wound bodies, and at least one of the one or a plurality of metal foil wound bodies is a wound body of perforated metal foil having holes. The catalyst layer contains noble metal catalyst particles and a carrier for carrying the noble metal catalyst, and more noble metal catalyst particles are present in the catalyst layer on side surfaces of holes which face the upstream side of the exhaust gas flow than in the catalyst layer on side surfaces of holes which face the downstream side of the exhaust gas flow. As a result, in the exhaust gas purification device of the present invention, the probability of contact between the exhaust gas flow and the noble metal catalyst particles becomes high, whereby excellent NOx purification performance in particular in regions of high SV (space velocity) is achieved.

In exhaust gas purification devices in the prior art, which use metal substrates, since the catalyst layer is produced by wash-coating, a substantially homogeneous catalyst layer is formed on the entire surface of the metal substrate. Even in the case of metal substrates using a wound body of perforated metal foil, substantially homogeneous catalyst layers are formed in the side surfaces of the holes. In connection thereto, the present inventors have discovered that catalyst layers can be efficiently formed on side surfaces of holes which face the upstream side of the exhaust gas flow by supplying a slurry to an upper part of the substrate and discharging it from a lower part. In the exhaust gas purification device of the present invention, though the catalyst layer is non-homogeneous, since noble metal catalyst particles are concentrated on the surface which contacts the exhaust gas, high purification performance can be achieved.

Though the method for forming the catalyst layer by supplying slurry to an upper part of the substrate and discharging it from the lower part has been conventionally carried out in exhaust gas purification devices using a ceramic substrate, since ceramic substrates do not have holes as are present in a perforated metal foil, there are substantially no side surfaces of holes which face the upstream side of the exhaust gas flow or side surfaces of holes which face the downstream side of the exhaust gas flow. As a result, even if the catalyst layer is formed by supplying a slurry to the upper part of the ceramic substrate and discharging it from the lower part, the advantageous effect of the present invention as described above will not be obtained.

In the present description "side surfaces of holes which face the upstream side of the exhaust gas flow" means side surfaces of holes in the longitudinal direction of the metal foil, which are the surfaces which form an angle of 45° to 135° with the axial direction of the substrate, which is a wound body, and which come into contact with the exhaust gas flow from upstream. Even on the same curved surface, the "side surfaces of holes which face the upstream side of the exhaust gas flow" may be only a part of the curved surface in some cases. The "side surfaces of holes which face the downstream side of the exhaust gas flow" are similarly interpreted.

In the exhaust gas purification device of the present invention, per unit area on a weight basis, it is preferable that there be an average of 1.1 times or more, 1.5 times or more, 2 times or more, 5 times or more, 10 times, or 20 times, or more, more noble metal catalyst particles in the catalyst layer on side surfaces of holes which face the upstream side of an exhaust gas flow than in the catalyst layer on side surfaces of holes which face the downstream side of the exhaust gas flow. There may be substantially no noble metal catalyst particles in the catalyst layer on the side surfaces of holes which face the downstream side of the exhaust gas flow.

The exhaust gas purification device of the present invention can be used as the exhaust gas purification device for the internal combustion engine of a motorcycle, a generator, or agricultural machinery.

Metal Substrate

As long as the metal substrate used in the exhaust gas purification device of the present invention is a wound body of metal foil having holes, the specific type thereof and the shapes of the holes are not particularly limited. Thus, the wound body of perforated metal foil may be a wound body which is known in the relevant field, in which a flat foil and a corrugated foil are stacked.

When the metal substrate is a wound body in which a flat foil and a corrugated foil are stacked, one laminate or a plurality of laminates of the corrugated foil and the flat foil may be simply rolled, or a plurality of laminates may be rolled into an S-shape as described in Patent Literature 1.

When the metal substrate is a wound body in which a flat foil and a corrugated foil are stacked, holes may be present in both the flat foil and the corrugated foil, or holes may be present in only one thereof. The holes of the flat foil and/or the corrugated foil may be present equally across the entirety of the circumferential direction and the axial direction of the wound body or may be unevenly distributed in some areas. For example, the holes of the flat foil and the corrugated foil may not be present in the ends thereof. The holes of the flat foil and the corrugated foil may not be present in the central portion in the axial direction, as described in Patent Literature 2.

Figure 2:
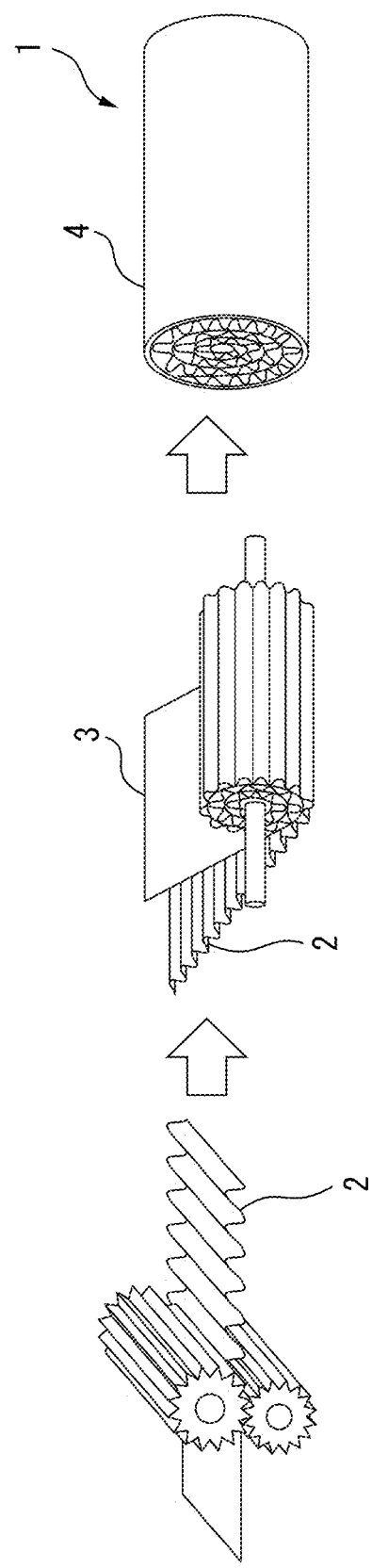
FIG. 2 is a schematic view showing a conventional process for producing a metal substrate composed of a corrugated foil and a flat foil.

The corrugated shape of the corrugated foil is not limited to the corrugated shape the corrugated foil 2 shown in FIG. 2 but may be in the shape of omega-shaped corrugation or zig-zag-shape corrugation.

All or a part of the holes of the perforated metal foil may be circular or oval, or may be non-circular, for example, polygonal. The equivalent diameters of the holes may be 2.0 mm or more, 2.5 mm or more, 3.0 mm or more, 4.0 mm or more, 5.0 mm or more, or 7.0 mm or more, and may be 20 mm or less, 15 mm or less, 10 mm or less, 7.0 mm or less, 5.0 mm or less, or 4.0 mm or less. Note that "equivalent diameter" refers to the diameter of a perfect circle having an outer circumferential length equal to the outer circumferential length of the surface thereof.

The metal substrate may have 50 cells/in$^2$ to 800 cells/in$^2$, for example, it may have 80 cells/in$^2$ or more, 100 cells/in$^2$ or more, 150 cells/in$^2$ or more, 200 cells/in$^2$ or more, or 300 cells/in$^2$ or more, and it may have 600 cells/in$^2$ or less, 400 cells/in$^2$ or less, 300 cells/in$^2$ or less, or 200 cells/in$^2$ or less.

The metal substrate may optionally have an outer cylinder. The wound body is arranged inside the outer cylinder, and they may be bonded by means such as brazing.

The thickness of the perforated metal foil is not particularly limited, and may be 20 μm or more, 40 μm or more, 80 μm or more, or 100 μm or more, and may be 500 μm or less, 300 μm or less, 200 μm or less, 100 μm or less, or 80 μm or less. When both the flat foil and the corrugated foil are present, they may each have such a thickness.

Metal Substrate-Expanded Metal Wound Body

In order to achieve the advantageous effects of the present invention, it is preferable that the side surfaces of holes which face the upstream side of the exhaust gas flow be as large as possible. From this point of view, it is particularly preferable that a wound body which is a wound body of an expanded metal (so-called "lath mesh") be used as the metal substrate, as disclosed in Patent Literature 3 and 4.

Figure 3:
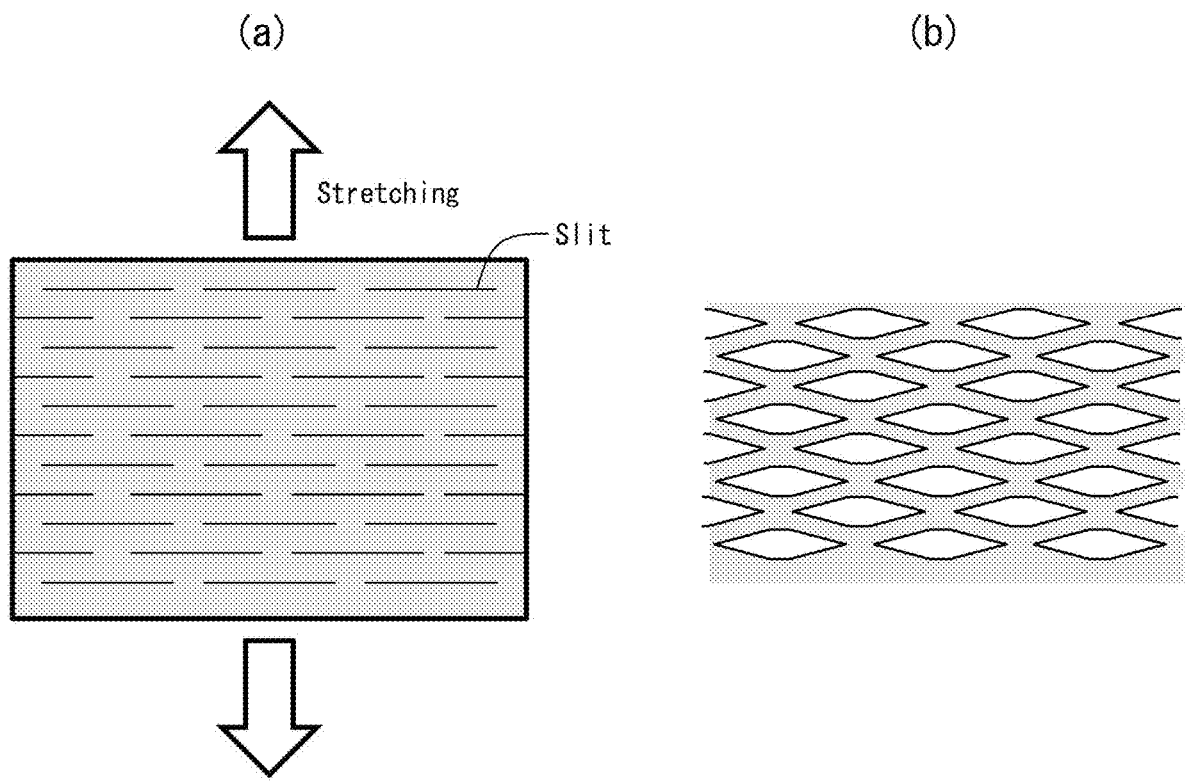
FIG. 3(a) is a schematic view showing a metal foil having staggered slits formed therein for obtaining an expanded metal.
FIG. 3(b) is a schematic view of an expanded metal and shows a state in which the metal foil having staggered slits shown in FIG. 3(a) is extended.
Figure 4:
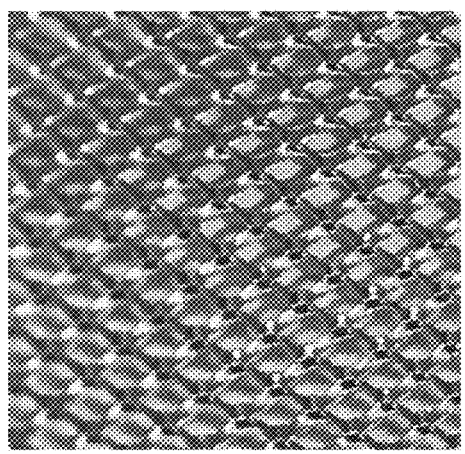
FIG. 4 is a photograph of a specific example of an expanded metal.

FIG. 1(a) is a schematic view showing the exhaust gas purification device according to the present invention in which a perforated metal foil, which is an expanded metal, wound body is used as the metal substrate. By stretching a metal foil having slits in a staggered shape as schematically illustrated in FIG. 3A, an expanded metal foil having holes as shown in FIG. 3(b) can be obtained. An actual photograph of an example thereof is shown in FIG. 4. The sizes of the holes and the size of the line width of the substrate can be adjusted in the intervals between the slits. A wound body in which a flat foil and a corrugated foil constituted by expanded metal are stacked is particularly preferable because the areas of the side surfaces of holes which face the upstream side of the exhaust gas flow become very large.

Figure 5:
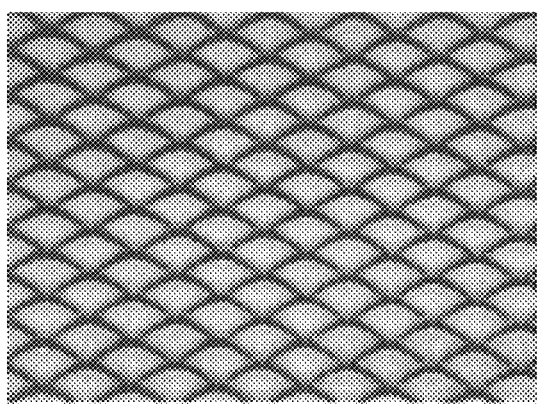
FIG. 5(a) is a top view showing an example of an expanded metal.
FIG. 5(b) shows an example of a cross-section of the expanded metal.
FIG. 5(c) shows an example of a hole of the expanded metal.
Figure 5:
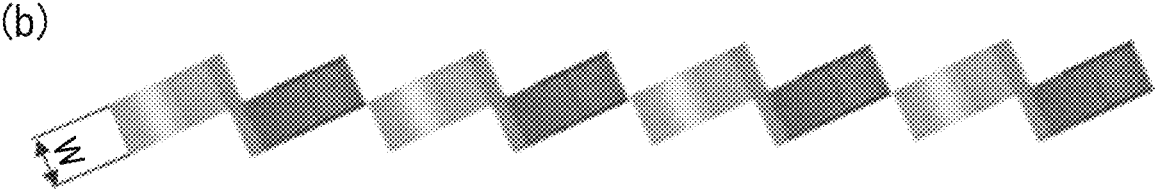
Figure 5:
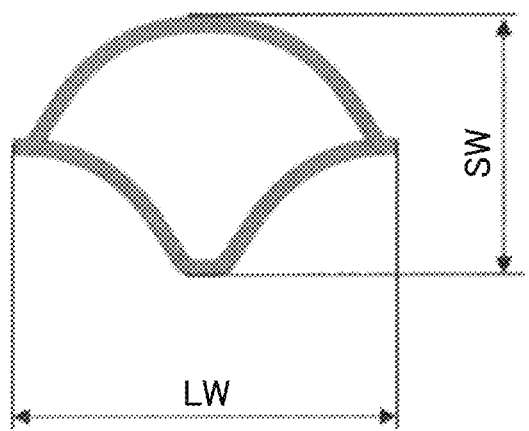

As shown in FIG. 5(a), in an expanded metal, generally, fan-shaped holes, when viewed in a top view, are formed. In this case, when viewed in a cross-sectional view, as shown in FIG. 5(b), continuous steps are present. The dimensions of the expanded metal can be specified by the dimensions W of these steps, and by SW and LW as shown in FIG. 5(c).

SW may be, on average, 0.1 mm or more, 0.3 mm or more, 0.5 mm or more, 1.0 mm or more, 1.5 mm or more, 2.0 mm or more, or 3.0 mm or more, and may be 5.0 mm or less, 4.0 mm or less, 3.0 mm or less, 2.0 mm or less, 1.5 mm or less, or 1.0 mm or less. In general, by increasing SW, the exhaust gas efficiently contacts the wound body, whereby the heat transfer coefficient (warm-up performance) tends to be improved. Even if SW is increased, the pressure loss does not tend to decrease significantly.

LW may be, on average, 0.1 mm or more, 0.3 mm or more, 0.5 mm or more, 1.0 mm or more, 1.5 mm or more, 2.0 mm or more, or 3.0 mm or more, and may be 5.0 mm or less, 4.0 mm or less, 3.0 mm or less, 2.0 mm or less, 1.5 mm or less, or 1.0 mm or less. In general, by increasing LW, the pressure loss can be reduced, whereby the heat transfer coefficient (warm-up performance) tends to decrease.

W may be, on average, 0.1 mm or more, 0.3 mm or more, 0.5 mm or more, 1.0 mm or more, 1.5 mm or more, 2.0 mm or more, or 3.0 mm or more, and may be 5.0 mm or less, 4.0 mm or less, 3.0 mm or less, 2.0 mm or less, 1.5 mm or less, or 1.0 mm or less. In general, by increasing W, the heat transfer coefficient (warm-up performance) tends to decrease. By increasing W, the pressure loss tends to increase. This is believed to be because W does not lead to efficient surface area usage as compared to SW and LW.

As characteristics of the exhaust gas purification catalyst, it is preferable that the heat transfer coefficient (warm-up performance) be high and the pressure loss be low. Thus, in consideration of only these points, it is preferably that SW be as large as possible, it is necessary that LW be selected in accordance with the importance of the warm-up performance and the pressure loss, and it is preferable that W be as small as possible.

The method for producing the wound body can include making staggered cuts in the metal foil, stretching the metal foil in which these cuts were formed to obtain an expanded metal, and winding the expanded metal. When the wound body is a wound body of a laminate including a flat foil and a corrugated foil, the method can further include supplying the expanded metal obtained as described above as the flat foil, machining the flat foil into a corrugated shape to obtain a corrugated foil, and stacking the flat foil and the corrugated foil to obtain a laminate thereof. These methods may optionally include inserting and affixing this wound body in an outer cylinder.

Wound Body of Metal Substrate-Perforated Metal Foil Having Punched Holes

In addition to an expanded metal, a wound body of perforated metal foil in which the holes are opened in the metal foil using a punching machine (a wound body of perforated metal foil having punched holes) can be used as the metal substrate. FIG. 1(b) is a schematic view showing the exhaust gas purification device according to the present invention in which a wound body of perforated metal foil having punched holes is used as the metal substrate. In the aspect of FIG. 1(b), the hole sizes are different in the corrugated foil and the flat foil.

The aperture rate (percentage of volume reduced by the presence of holes) of the metal foil having punched holes may be 10% or more, 20% or more, 30% or more, 40% or more, 50% or more, or 60% or more, and may be 90% or less, 80% or less, 70% or less, 60% or less, 50% or less, 40% or less, or 30% or less. When the wound body is constituted by a flat foil and a corrugated foil, each may have such aperture rate or only one may have such an aperture rate.

The pitch of adjacent holes (center distance of adjacent holes) in the axial direction of the wound body having punched holes may be, for the holes of each of the flat foil and the corrugated foil, 5.0 mm or more, 6.0 mm or more, 8.0 mm or more, 10.0 mm or more, 12 mm or more, or 15 mm or more, and may be 25 mm or less, 20 mm or less, 15 mm or less, 10 mm or less, 7.0 mm or less, or 5.0 mm or less. Note that in this case, the pitch of the holes of the corrugated metal foil refers to the pitch when the corrugated foil is stretched flat.

The pitch of adjacent holes in the circumferential direction of the wound body having punched holes may be, for the holes of each of the flat foil and the corrugated foil, 5.0 mm or more, 6.0 mm or more, 8.0 mm or more, 10.0 mm or more, 12 mm or more, or 15 mm or more, and may be 25 mm or less, 20 mm or less, 15 mm or less, 10 mm or less, 7.0 mm or less, or 5.0 mm or less. Note that in this case, the pitch of the holes of the corrugated metal foil refers to the pitch when the corrugated foil is stretched flat.

The method for producing a wound body of perforated metal foil having punched holes can include piercing a metal foil with a punching machine to obtain a perforated metal foil having punched holes, and winding this perforated metal foil having punched holes. When this wound body is a wound body of a laminate of a flat foil and corrugated foil, the method can further include supplying the perforated metal foil having punched holes obtained as described above as the flat foil, machining the flat foil into a corrugated shape to obtain a corrugated foil, and stacking the flat foil and the corrugated foil and winding the laminate thereof. These methods may optionally include inserting and affixing the wound body in an outer cylinder.

Catalyst Layer

The exhaust gas purification device of the present invention comprises a metal substrate and a catalyst layer on the metal substrate. The catalyst layer includes noble metal catalyst particles and a carrier for carrying the noble metal catalyst, and can have a structure which is known in the relevant field.

Any known catalyst carrier, in particular metal oxide carrier, used in the relevant field can be used as the carrier. For example, ceria, zirconia, alumina, rare earth metal oxides, as well as composite oxides comprising a plurality of these can be used.

Examples of the noble metal of the noble metal catalyst particles include platinum, palladium, and rhodium. The particles of these noble metals may have an average particles size of, for example, 1 nm or more, 3 nm or more, 5 nm or more, or 10 nm or more, and 100 nm or less, 50 nm or less, 30 nm or less, 20 nm or less, or 10 nm or less, and may be carried on a metal oxide carrier.

Method for Producing Exhaust Gas Purification Device

The method for producing the exhaust gas purification device of the present invention can include (a) supplying a catalyst layer-forming slurry to one end of a wound body of perforated metal foil, (b) coating the wound body with the catalyst layer-forming slurry by discharging the supplied catalyst layer-forming slurry from the other end of the wound body, and (c) drying the coated wound body.

The exhaust gas purification device obtained by the production method of the present invention may be the exhaust gas purification device of the present invention described above. Thus, regarding the structure of the wound body used in the production method of the present invention, refer to the structure of the wound body described regarding the exhaust gas purification device of the present invention.

Prior to the step (a) of supplying the slurry, the production method of the present invention may further include a step in which a carrier layer for carrying the noble metal catalyst particles is formed on the wound body. By including this step, in the obtained exhaust gas purification device, noble metal catalyst particles are more likely to be present on the surface of the catalyst layer.

Step (a) Supplying Slurry

In the step of supplying the catalyst layer forming slurry to one end of the wound body, the slurry can be substantially uniformly supplied from the upper part of the wound body using a shower nozzle as described in, for example, Patent Literature 6.

In the step of supplying slurry, a guide can be used to prevent the slurry from leaking out from the upper part of the wound body and running down the outer surface of the wound body. Such a guide is also disclosed in Patent Literature 5 and 6.

The catalyst layer forming slurry is a slurry for forming a catalyst layer as described in relation to the exhaust gas purification device of the present invention described above. For example, the catalyst layer forming slurry is an aqueous slurry in which an inorganic oxide carrier or an inorganic composite oxide carrier such as alumina, zirconia, or ceria, and noble metal catalyst particles or a precursor thereof are dispersed.

The viscosity of the slurry is preferably comparatively high, and the viscosity at a shear rate of 4 $s^{-1}$ may be 100 mPa·s or more, 200 mPa·s or more, 500 mPa·s or more, 1000 mPa·s or more, or 2000 mPa·s or more, and may be 7000 mPa·s or less, 6000 mPa·s or less, 5000 mPa·s or less, 4000 mPa·s or less, 3000 mPa·s or less, 2500 mPa·s or less, or 2000 mPa·s or less. Viscosity measurement is carried out using an E-type viscosity meter (TVE-35H manufactured by Toki Sangyo Co., Ltd.) at a measurement temperature of 25° C. and a using a 1°34 ⌧ R24 type rotor.

In order to adjust the viscosity, 5.0 wt % or less, 3.0 wt % or less, 1.0 wt % or less, 0.5 wt % or less, 0.3 wt % or less, or 0.1 wt % or less of a thickener may be included in the slurry. A water-soluble organic polymer can be used as the thickener.

Step (b) Coating

The step of coating the wound body with the slurry is carried out by discharging the catalyst layer forming slurry supplied in step (a) from the other end of the wound body. In this case, suctioning may be carried out from the lower part side of the honeycomb substrate to promote the flow of the slurry, as described in Patent Literature 5 and 6.

Step (c) Drying and/or Firing

The drying and/or firing conditions of the wound body which has been coated with the slurry are not particularly limited, and firing can be carried out at, for example a temperature of 400 to 1000° C. for approximately 1 to 4 hours. As a result, the desired catalyst layer can be formed. Drying may be carried out prior to firing. The conditions thereof are not particularly limited, and drying can be carried out at, for example, 80 to 300° C. for 1 to 12 hours.

The present invention will be further specifically described by way of the following examples, but the present invention is not limited thereby.

EXAMPLES

Production Example

Example 1

A carrier layer-forming slurry A containing 50 g/L of $Al_2O_3$, 33 g/L of $CeO_2$, 53 g/L of $ZrO_2$, and 9 g/L of $La_2O_3$ was prepared.

A catalyst layer-forming slurry B was also prepared by adding a Pd nitrate solution and a Rh nitrate solution to slurry A described above so as to achieve Pd concentration of 0.50 g/L and a Rh concentration of 0.14 g/L.

A wound body (53.5 mm diameter, 120 mm length, 300 cells/in$^2$, thickness 50 μm) of a laminate of a flat foil and a corrugated foil, each of which was constituted by an expanded metal, was coated with 120 g/L of slurry A, then dried at 250° C. for 1 hour, and thereafter fired at 500° C. for 1 hour to obtain a wound body of perforated metal foil, having a carrier layer.

30 g/L of slurry B was supplied to an upper part of the wound body having a carrier layer and suctioned from the lower part thereof to coat the wound body having a carrier layer with slurry B. Thereafter, it was dried at 250° C. for 1 hour and subsequently fired at 500° C. for 1 hour to obtain the exhaust gas purification device of Example 1.

Comparative Example 1

The perforated metal foil, which is an expanded metal, wound body was coated with 150 g/L of slurry A, dried at 250° C. for 1 hour, and then fired at 500° C. for 1 hours to obtain a perforated metal foil wound body having a carrier layer.

Next, the wound body having a carrier layer was immersed in a solution obtained by diluting a Pd nitrate solution and a Rh nitrate solution so that the same amounts of Pd and Rh as in the exhaust gas purification device of Example 1 were carried thereon. Thereafter, the wound body was removed from this solution and dried at 250° C. for 1 hour to obtain the exhaust gas purification device of Comparative Example 1.

Evaluation

Figure 6:
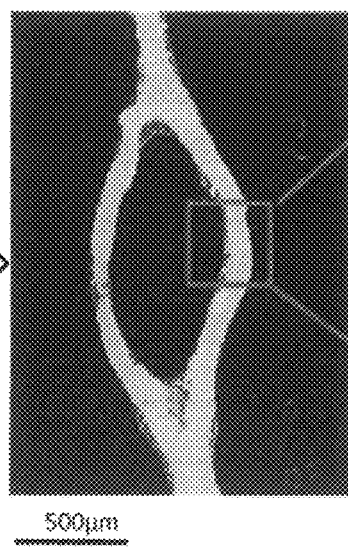
FIG. 6(a) shows the results of analysis of the noble metal concentration of the exhaust gas purification device of Example 1 using an EPMA.
FIG. 6(b) shows the results of analysis of the noble metal concentration of the exhaust gas purification device of Comparative Example 1 using an EPMA.
Figure 6:
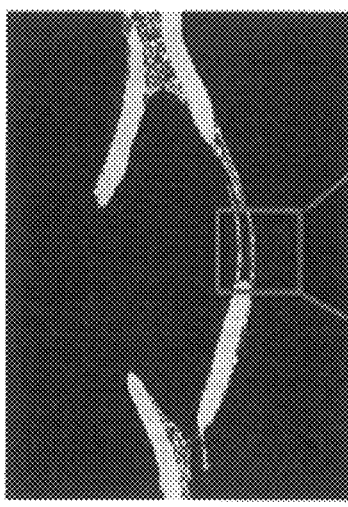

Analysis of the noble metal concentrations of the exhaust gas purification devices of Example 1 and Comparative Example 1 was carried out using an EPMA (Electronic Probe Micro Analyzer) (JXA-8530F manufactured by Japan Electronics, Co., Ltd.), and the results are shown in FIG. 6.

In the exhaust gas purification device of Example 1, it was found that noble metal was present in substantially only the side surfaces of holes which face the upstream side of the exhaust gas flow. Conversely, in the exhaust gas purification device of Comparative Example 1, it was found that the quantities of noble metal in the side surfaces of holes which face the upstream side of the exhaust gas flow and the side surfaces of holes which face the downstream side of the exhaust gas flow were substantially equal.

Exhaust Gas Purification Performance

Durability evaluation was carried out for the exhaust gas purification devices of Example 1 and Comparative Example 1 for 20 hours with the internal temperature of the exhaust gas purification device set to 900° C. while changing the air-fuel ratio (A/F) in the range of 13.5 to 17.5. The exhaust gas purification rate of the exhaust gas discharged from a vehicle with a 2 L engine was calculated at each air-fuel ratio. In order to simulate regions of high SV, the exhaust gas flow rate was set to 1050/min.

Figure 7:
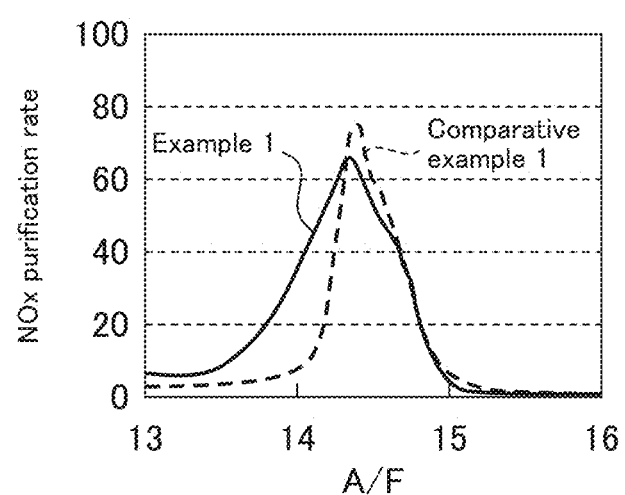
FIG. 7 shows the results of a comparison between of NOx purification performance at various air-fuel ratios for the exhaust gas purification devices of Example 1 and Comparative Example 1.

The results are shown in FIG. 7. As can be understood from FIG. 7, the exhaust gas purification device of Example 1 had a higher NOx purification performance across a wide range of air-fuel ratios than the exhaust gas purification device of Comparative Example 1.

REFERENCE SIGNS LIST 1 metal substrate
2 corrugated foil
3 flat foil
4 outer cylinder

The invention claimed is:

1. An exhaust gas purification device comprising a metal substrate and a catalyst layer on the metal substrate, wherein
the metal substrate is a wound body of one or a plurality of metal foils,
at least one of the one or a plurality of metal foils is a perforated metal foil having holes, the perforated metal foil being an expanded metal,
the catalyst layer contains noble metal catalyst particles and a carrier for carrying the noble metal catalyst particles, and
more noble metal catalyst particles are present in the catalyst layer on side surfaces of holes, which face an upstream side of an exhaust gas flow, than in the catalyst layer on side surfaces of holes, which face a downstream side of the exhaust gas flow.

2. The exhaust gas purification device according to claim 1, wherein per unit area on a weight basis, an average of 1.1 times more noble metal catalyst particles are present in the catalyst layer on side surfaces of holes, which face the upstream side of an exhaust gas flow, than in the catalyst layer on side surfaces of holes, which face the downstream side of the exhaust gas flow.

3. The exhaust gas purification device according to claim 1, wherein the wound body is a wound body in which a flat foil and a corrugated foil are stacked.

4. The exhaust gas purification device according to claim 3, wherein the aperture rates of the flat foil and the corrugated foil are each in the range of 10% to 90%.

5. A method for producing an exhaust gas purification device comprising a metal substrate and a catalyst layer on the metal substrate, the method comprising at least the following steps (a) to (c):

(a) supplying a catalyst layer-forming slurry from one end of the metal substrate, the metal substrate being a wound body of one or a plurality of metal foils, at least one of the one or a plurality of metal foils being a perforated metal foil having holes, the perforated metal foil being an expanded metal;

(b) coating the wound body with the catalyst layer-forming slurry by discharging the supplied catalyst layer-forming slurry from the other end of the wound body; and (c) drying and/or firing the coated wound body, wherein:

the catalyst layer contains noble metal catalyst particles and a carrier for carrying the noble metal catalyst particles, and more noble metal catalyst particles are present in the catalyst layer on side surfaces of holes, which face an upstream side of an exhaust gas flow, than in the catalyst layer on side surfaces of holes, which face a downstream side of the exhaust gas flow.

* * * * *